United States Patent [19]

Senma et al.

[11] Patent Number: 4,975,738

[45] Date of Patent: Dec. 4, 1990

[54] METHOD OF FORMING AN IMAGE ON BOTH SIDES OF A SHEET

[75] Inventors: Toshitaka Senma, Yokohama; Mitsuo Tanaka, Tokyo, both of Japan

[73] Assignee: Ricoh Company, Ltd., Tokyo, Japan

[21] Appl. No.: 467,015

[22] Filed: Jan. 18, 1990

[51] Int. Cl.⁵ ...................... G03B 27/32; G03B 27/52; G03G 21/00

[52] U.S. Cl. ........................................ 355/77; 355/24; 355/314; 355/319

[58] Field of Search ................. 355/77, 313, 314, 318, 355/319, 24

[56] References Cited

U.S. PATENT DOCUMENTS

| | | | |
|---|---|---|---|
| 4,499,500 | 2/1985 | Nagashima | 358/296 |
| 4,640,607 | 2/1987 | Bray | 355/319 X |
| 4,692,020 | 9/1987 | Tsujihara | 355/319 |
| 4,806,979 | 2/1989 | Tokoro et al. | 355/319 |
| 4,845,527 | 7/1989 | Murata et al. | 355/319 X |
| 4,884,110 | 11/1989 | Tsurubuchi et al. | 355/319 |

*Primary Examiner*—Richard A. Wintercorn

*Attorney, Agent, or Firm*—Cooper & Dunham

[57] ABSTRACT

A method of forming images on both sides of a plurality of sheets by an image forming apparatus having an image forming unit and a sheet path selection unit comprises a repetition of a group of substeps as a job unit, the group of substeps including substeps of feeding a predetermined number of new sheets to the image forming unit, forming the images on a first side of the sheets, turning over the side of the sheets by the sheet path selection unit, refeeding the predetermined number of sheets to the image forming unit responsive to the turning-over of each sheet, forming the images on a second side of the sheets by the image forming unit, and discharging the predetermined number of sheets by the sheet path selection unit each time the sheet is formed with the image on the second side thereof, wherein said substep of feeding the new sheets is commenced for a new job unit when the last sheet of the currently performed job unit is fed to the sheet path selection unit after formed with the image on its second side but before the last sheet is discharged.

8 Claims, 13 Drawing Sheets

CONTROL OF PRINTER UNIT IN MODE "SUBJOB I".

CONTROL OF PRINTER UNIT IN MODE "SUBJOB II".

CONTROL OF TURN-OVER UNIT IN MODE "SUBJOB III".

CONTROL OF TURN-OVER UNIT IN MODE "SUBJOB IV".

METHOD OF FORMING AN IMAGE ON BOTH SIDES OF A SHEET

BACKGROUND OF THE INVENTION

The present invention generally relates to forming of images on a sheet and more particularly to a method of forming an image on both sides of a sheet.

When forming a number of images on both sides of a number of sheets as in a photocopier, printer, facsimile and the like, a method is conventionally adopted in which the formation of the images on one side of the sheet is first completed for the entire sheets and the sheets thus formed with the images are stored once in a suitable means such as a tray. Then, the formation of the image is performed on the other side of the sheets by feeding the sheets from the tray one by one after turning over of the sheets by a sheet turn-over mechanism and the like.

For example, when taking a copy of a sixty page document printed on both sides of a thirty sheet of papers, thirty images on a first side of the original sheets are consecutively recorded on thirty copy sheets by feeding the copy sheets one by one and these thirty copy sheets thus recorded with the images are stored in an intermediate tray. After the copy of the thirty images is completed, the stacked copy sheets are fed one by one again and the images on a second side of the original sheets of the document are recorded on the other side of the copy sheets consecutively. Such a method of image formation is called a "stack mode".

In such a prior art image formation method, it is necessary to separate the sheets on the intermediate tray one by one with absolute reliability. When the separation of the sheets is defective and two or more sheets are fed at the same time or feeding the the sheet is jammed, there occurs a problem that the reproduction of the entire document is failed.

Further, as it is usual to set the sheets on the intermediate tray for proper feeding by laterally pressing both sides of the sheets stacked on the tray by a pair of guide plates, there is a problem in such a prior art method in that sheets having different sizes cannot be used or mixed. In other words, copy of documents containing sheets or papers having different sizes cannot be made according to this method.

Further, in order to handle a case in which a jam or other failure has occured in the feeding of the sheets, an information indicating the page of the document at which the failure has occured is desired to be produced. Otherwise, the entire document has to be read from the beginning. This means, however, that the information about the feeding of the sheet has to be stored in a controller for the entire sheets and the load of controlling task of the controller is increased.

SUMMARY OF THE INVENTION

Accordingly, it is a general object of the present invention to provide a novel and useful method of forming images on both sides of sheets wherein the aforementioned problems are eliminated.

Another object of the present invention is to provide a method of forming images on both sides of sheets wherein feeding of the sheets, which are already recorded with images on one side, is made with reliability for recording the images on the other side.

Another object of the present invention is to provide a method of forming images on both sides of a number of sheets wherein the images can be formed or recorded on the sheets having different sizes.

Another object of the present invention is to provide a method of forming images on both sides of a number of sheets wherein the formation of the images can be interrupted with a state in which all the sheets that have been already formed with the images have the images on the both sides thereof.

Another object of the present invention is to provide a method of forming images on both sides of sheets wherein the load of a controller is reduced.

Another object of the present invention is to provide a method of forming images on both sides of a plurality of sheets wherein the formation of the images is performed as a repetition of jobs each comprising a step of forming the images on both sides of a predetermined number of sheets which is equal to or smaller than a maximum number of sheets that can be held in an image forming path of an image forming apparatus, and wherein a new job is started before the last sheet of the previous job formed with the images on the both sides is discharged from the image forming apparatus. According to the present invention, feeding of the sheet is made one by one with reliability as the sheets are not stacked at an intermediate location in the path of the sheet. As the step of stacking the sheets carrying the images on one side before forming the images on the other side is eliminated, problems such as feeding a plurality of sheets at one time from the stack and losing the correspondence of the images on the front side and on the rear side, are positively eliminated. Further, according to the present invention, the interruption of the image formation can be made so that the printer is stopped responsive to the completion of the jobs. More specifically, when a command is given instructing the interruption of the image formation although without urgency, the image formation is interrupted after the currently performed job is finished. As a result, the sheets that are obtained before the interruption have the images on both sides and the restarting of the image formation is made from a new sheet. In other words, the restarting is made easily. Note that there remains no sheet in the image forming apparatus that is recorded with the image only on one side. Thereby, the control of the apparatus by the controller for restarting the image formation becomes significantly simplified and the load of the controller is reduced.

Another object of the present invention is to provide a method of forming images on both sides of a plurality of sheets, comprising a repetition of jobs each comprising a step of forming the images on both sides of a predetermined number of sheets which can be fed at one time on a path of the sheets in an image forming apparatus, wherein the sheets in the path is prohibited from being fed when there occurs a delay in the formation of the image in the apparatus except for those sheets that are already formed with the images on both sides thereof. According to the present invention, the feeding of the sheet is controlled such that the sheets wait for the apparatus becoming ready for image forming at respective locations in the path of the sheet in the apparatus while the sheet already recorded with the images on the both sides is discharged without waiting. Thus, the image formation can be performed efficiently. Such a feature is particularly useful in a facsimile or printer of computers where a delay tends to appear in the information of the images to be printed on the sheets depending on the load of the line or microprocessor.

Other objects and further features of the present invention will become apparent from the following detailed description when read in conjunction with attached drawings.

DETAILED DESCRIPTION

Figure 1:
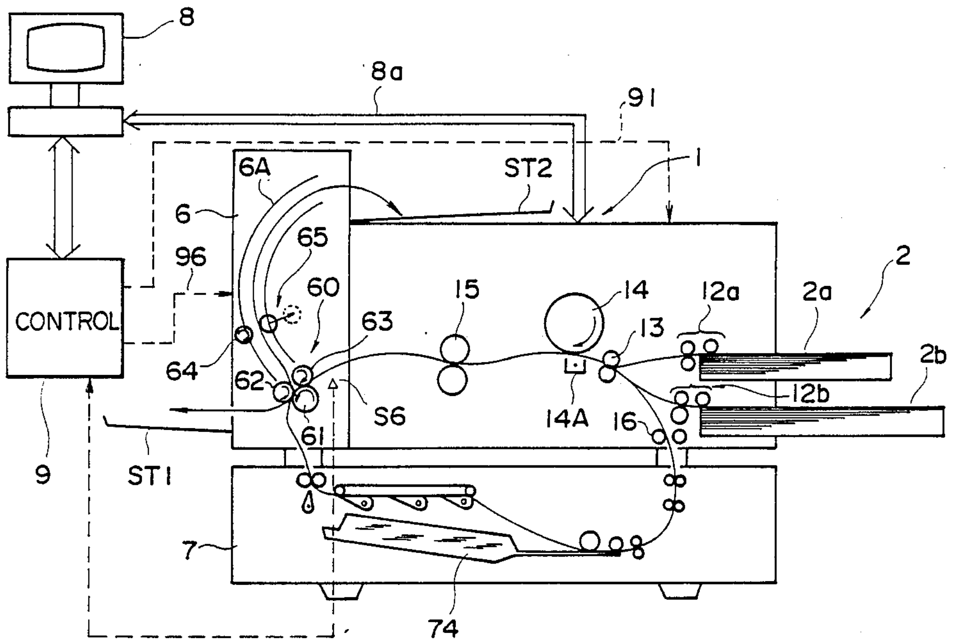
FIG. 1 is a schematical view showing a printer to which the present invention is applicable.

FIG. 1 shows an overall construction of an embodiment of the image forming apparatus according to the present invention. Note that the apparatus of FIG. 1 is a laser printer although the present invention is by no means limited to such a laser printer but can be applicable to other type of image forming apparatuses such as facsimile or photocopier as well.

Referring to FIG. 1, a sheet is stored in a sheet feed part 2 attached to a printer unit 1. In the illustrated example, the sheet feed part 2 comprises a first tray 2*a* and a second tray 2*b* respectively storing sheets having a first standardized size and a second standardized size.

The printer unit 1, on the other hand, comprises a first feed rollers 12*a* for engagement with the sheet in the tray 2*a*, when the tray is set on the printer unit 1, for drawing out the uppermost sheet from the tray 2*a* and a second feed rollers 12*b* for engagement with the sheet in the tray 2*b* set to the printer unit 1 for drawing out the uppermost sheet similarly to the feed rollers 12*a*. Further, the printer unit comprises a timing roller 13 supplied with the sheet either from the tray 2*a* or from the tray 2*b* for adjusting the timing that the sheet is fed forward and a photosensitive drum 14 for carrying an electrostatic latent image written thereon by a laser beam scanning system (not illustrated). Such an image is produced in a host computer 8 and the like and is supplied to the photosensitive drum 14 via a bus 8*a* and the laser beam scanning system or further via a controller 9 to be described.

Further, there is provided a developing system (not shown) associated with the photosensitive drum 14 for visualizing the electrostatic latent image. This visualized image, or toner image, is rotated together with the rotation of the drum 14 and is transferred on the sheet, which is fed from the timing roller 13, by a transfer charger 14A. The foregoing timing roller 13 thus adjust the timing such that the sheet is supplied with a proper timing with respect to the rotation of the photosensitive drum 14. In the foregoing procedure, the image written on the photosensitive drum 14 is transferred on a first side or a front side of the sheet. The sheet thus carrying the image on its first side is passed through a fixing station 15 where the image on the sheet is fixed, and the sheet is further supplied to a sheet turn-over unit 6.

The sheet turn-over unit 6 comprises a group of rollers 60 including three rollers 61, 62 and 63 wherein the rollers 61 and 62 are contacted each other and rotated in mutually opposing directions, and the rollers 61 and 63 are contacted each other and rotated also in mutually opposing directions. Thereby, the rollers 62 and 63 are rotated in a same direction. When the sheet is supplied from the printer unit 1 after passing through the fixing station 15, the sheet is received between the rollers 61 and 63 and is transported upward along a sheet discharging path 6A. In the path 6A, there is provided another roller 64 rotating in a direction so as to feed the sheet in the path 6A in a downward direction. In the illustrated example, this roller 64 is rotated in the clockwise direction. Further, there is another roller 65 which is movable between a first position away from the roller 64 and a second position in which the roller 65 is in firm engagement with the roller 64. When the sheet is supplied from the printer unit 1 for the first time the roller 65 is in the first state and the sheet is accepted in a loose state between the rollers 64 and 65 without substantial resistance.

When the sheet is to be printed with the image only on its first side, the sheet is further fed upward by a means not illustrated and is discharged to a tray ST2. When the sheet is to be printed with the image further on its rear side, on the other hand, the roller 65 is moved to the second position so as to press the sheet firmly on the roller 64. Thereby, the sheet is fed downward by the roller 64. Note that the roller 65 is a free-rotating roller. Such a switching of the state of the roller 65 is made by the controller 9 as will be described. When the sheet is transported downward, it is received between the roller 61 and the roller 62 and is supplied further downward to a sheet refeed unit 7.

Figure 2:
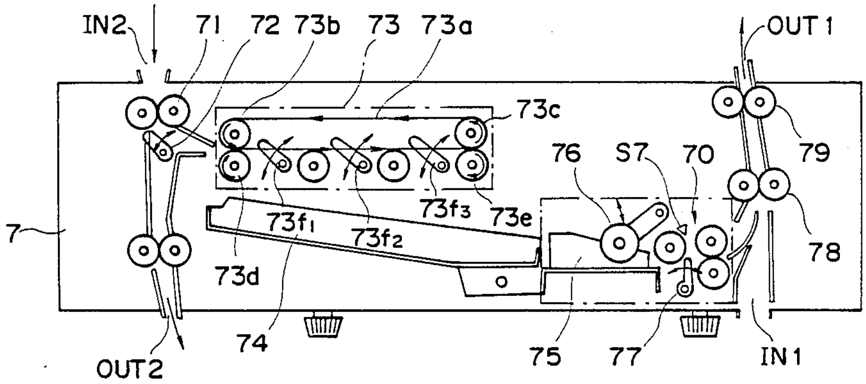
FIG. 2 is a view showing a construction of a sheet refeed unit used in the printer of FIG. 1.

FIG. 2 shows an embodiment of the refeed unit 7. Referring to FIG. 2, the unit 7 has a receiving roller 71 for receiving the sheet from the sheet turn-over unit 6 at an inlet IN2. The sheet thus received is directed to a size selection unit 73 by a pivotted path selecting finger 72. The size selection unit 73 comprises a belt 73*a* stretched between a pair of rollers 73*b* and 73*c* and other rollers 73*d* and 73*e* respectively engaging with the rollers 73*b* and 73*c*. The rollers 73*b* and 73*c* are driven so as to transport the sheet supplied between the rollers 73*b* and 73*d* by the path selecting finger 72 along the underside of the belt 73*a* toward the side of the printer unit 1 at which the sheet feed part 2 is provided. The size selection unit 73 further comprises a plurality of pivotted path selecting fingers $73f_1$–$73f_3$ which are actuated responsive to the size of the sheet. Thus, when the sheet is small, the finger $73f_3$ at the front end is actuated so as to interrupt the path of the sheet while the fingers $73f_1$ and $73f_2$ are actuated to a position not obstructing the path of the sheet. As a result, the sheet falls on a front part of a tray 74 provided below the gate unit 73. When the sheet is a large one, on the other hand, the finger $73f_1$ at the rear end is actuated. In this case, a front part of the sheet falls on a rear part of the tray 74 and is slided forward along the tray as the sheet is driven forward by the belt 73*a* or by the rollers 73*b* and 73*d*. In the case that the sheet is a medium sized one, the finger $73f_2$ is actuated so as to obstruct the path of the sheet while the rest of the fingers are actuated to a position away from the path of the sheet. Thereby, the sheet fed from the sheet turn-over unit 6 is supplied to the front part of the tray 74 with reliability.

The sheets thus reached to the front part of the tray 74 is then moved ahead for a short distance by engaging a pivotted feed roller 76 until the sheet is abutted to a stopper 74. Further, the feed roller 76 is disengaged and the lateral position of the sheet is adjusted by one or a pair of jogger plates 75 driven by a jogger motor (not illustrated). When the stopper 74 is removed from the path of the sheet in the refeed unit 7, the sheet is overtaken by feed rollers 78 and 79 and is fed upward to the printer unit 1 through an outlet OUT1. The sheet thus supplied is received by a feed roller 16 and is transported further until it reaches the timing roller 13 Note that this adjustment of the sheet position by the jogger plate 75 may be eliminated. FIG. 2 further shows another outlet OUT2 for directly taking out the sheet from the refeed unit without refeeding to the printer unit 1 and an inlet IN1 for inserting a sheet such that the sheet is fed to the printer unit 1. As these parts are not essential for the present invention, the description thereof will be omitted.

As the sheet in the refeed unit 7, such as the sheet on the tray 74, carries the image on its top side because of the switchback in the sheet turn-over unit 6, the sheet thus supplied to the printer unit 1 and fed further by the timing roller 13 makes a contact with the photosensitive drum 14 at its rear side which is not recorded with images. Thus, a new image is recorded on the rear side of the sheet by the drum 14 and the sheet is further supplied to the sheet turn-over unit 6 again after passing through the fixing station 15 similarly to the foregoing case. The sheet is then overtaken by the group of rollers 60 similarly to the foregoing case and is accepted in the path 6A. In this case, the roller 65 is disengaged and the sheet is discharged directly to the tray ST2.

Next, the operation and control of the printer of FIG. 1 according to the present invention will be described with reference to flowcharts describing a continuous procedure for forming images on a number of sheets consecutively.

Figure 3:
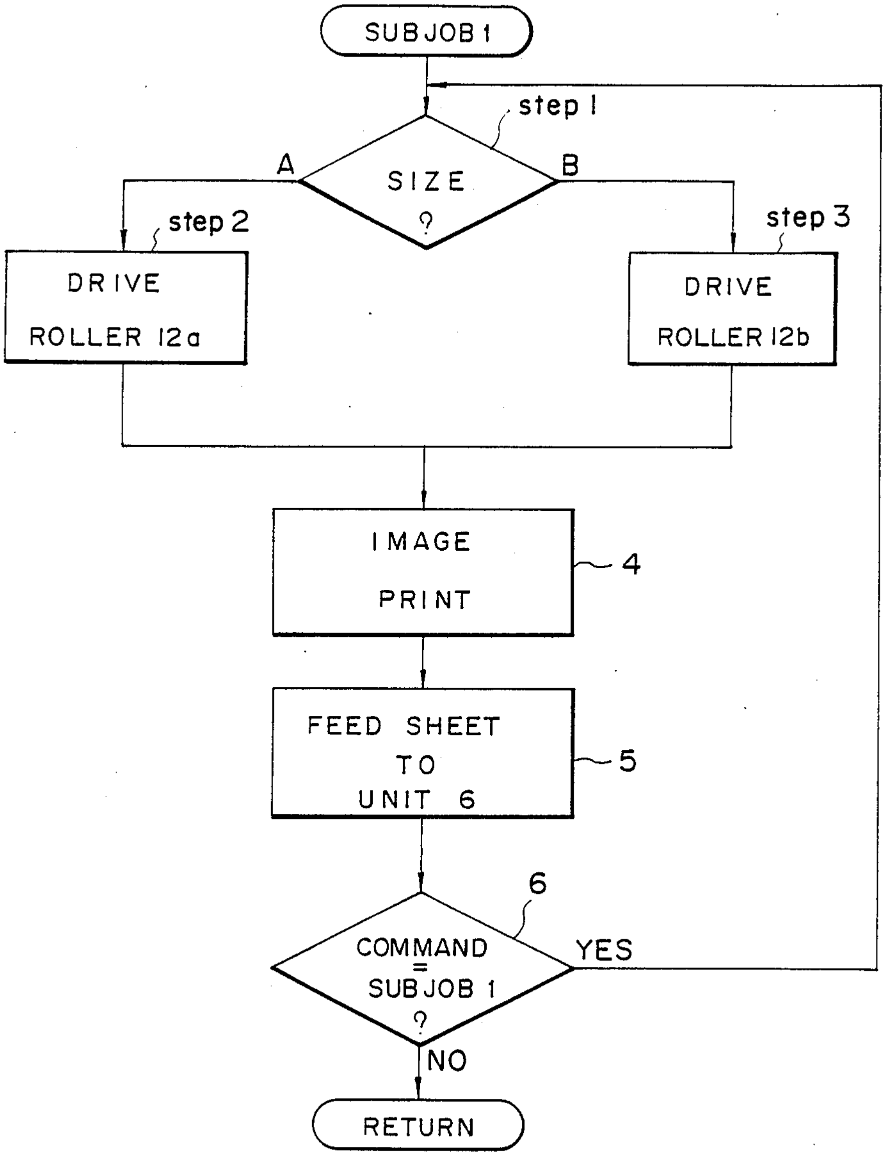
FIG. 3 is a flowchart showing the operation of a printer unit in the printer of FIG. 1 in a first mode.

FIG. 3 shows a flowchart showing an operation of the printer unit 1 in a first mode or a mode "SUBJOB I" under the control of the controller 9. In this mode, the printer is given a command "SUBJOB-1" from the controller 9 via a line 91 as well as an image data from the computer 8 via the bus 8*a*, and records an image on the sheets fed one after another according to the image data. Thus, in a first step 1, the the size of the sheet on which the image is to be formed is discriminated on the basis of the image data. Next, either one of the feed rollers 12*a* and 12*b* is driven in a step 2 or step 3 responsive to the size of the sheet specified by the image data and a sheet is supplied to the resist roller 13. In a step 4, the sheet is further fed forward and an image is recorded on one side of the sheet according to the image data by the photosensitive drum 14. The sheet thus printed with the image is then supplied to the turn-over unit 6 in a step 5 after passing through the fixing station 15. Further, in a step 6, it is discriminated if the mode command is still SUBJOB-1 or not, and if YES, the steps starting from the step 1 is repeated. When the result of discrimination is NO, the mode SUBJOB I is terminated. Thus, the feeding and printing of the sheet is performed repeatedly as long as the command is SUBJOB-1. Note that the sheet thus printed is supplied to the sheet turn-over unit 6 one by one.

Figure 4:
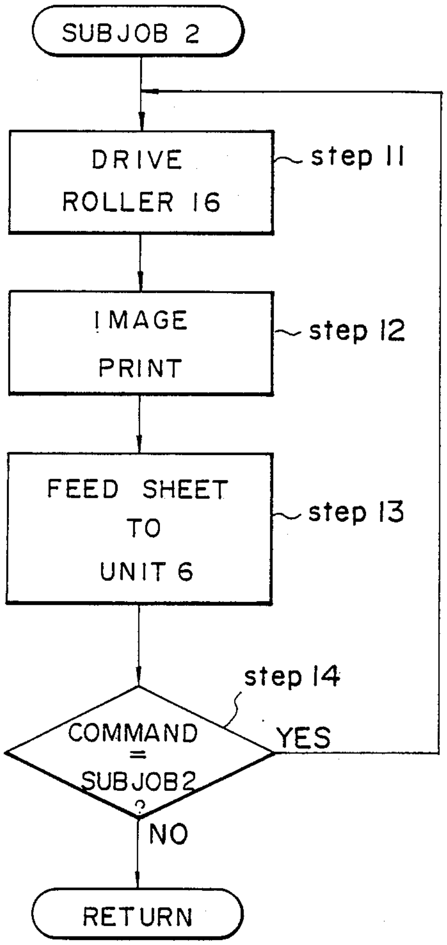
FIG. 4 is a flowchart showing the operation of the printer unit in a second mode.

FIG. 4 is a flowchart showing the operation of the printer unit 1 in a second mode or a mode "SUBJOB II". In this mode, a command SUBJOB-2 is given and responsive thereto, a sheet from the refeed unit 7 is fed to the resist roller 13 and further to the photosensitive drum 14. Thus, in a step 11, the feed roller 16 is driven and the sheet is fed to the resist roller 13. In a step 12, the sheet is further supplied to the photosensitive drum 14 similarly to the foregoing step 4 and the image supplied to the printer unit 1 is recorded on the sheet. In a step 13, the sheet is fed to the sheet turn-over unit 6 similarly to the step 5. In a step 14, it is discriminated if the command is still SUBJOB-2 or not, and if YES, the steps starting from the step 11 is repeated. When the result of the discrimination is NO, the mode SUBJOB II is terminated. The difference between the mode SUBJOB I and the mode SUBJOB II is that whether the sheet is supplied from the tray or from the refeed unit 7.

Figure 5:
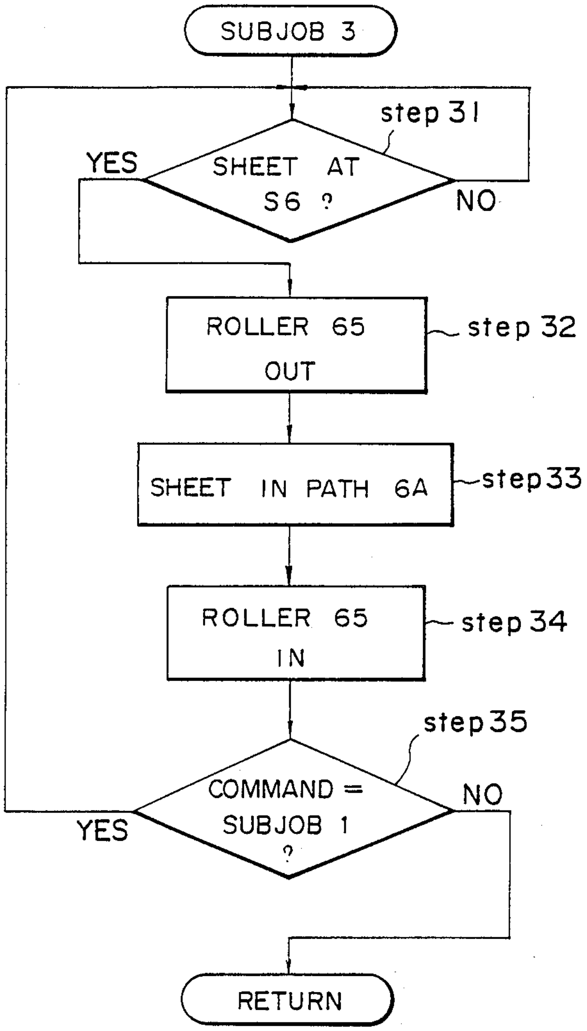
FIG. 5 is a flowchart showing the operation of a sheet turn-over unit in the printer of FIG. 1 in a first mode.

FIG. 5 is a flowchart showing the operation of the sheet turn-over unit 6 in a mode SUBJOB III. In this mode, a command SUBJOB-3 is supplied to the unit 6 via a line 96. Responsive to the command, it is discriminated in a step 31 if there is a sheet at the entrance of the unit 6. For this purpose, a sensor S6 is provided in the unit 6 in a vicinity of the group of rollers 6. When the sensor S6 does not detect the sheet, the step 31 is repeated. When the sheet is detected, on the other hand, the roller 65 is removed from the path 6A of the sheet in the unit 6 in a step 32 and the sheet is accepted in the path 6A in a step 33. Once the sheet is accepted fully in the path 6A, the roller 65 is engaged in a step 34 whereby the sheet is transported downwards to the refeed unit 7. Further, in a step 35, it is discriminated if the command is still SUBJOB-3 or not, and if YES, the steps starting from the step 31 is repeated while if NO, the mode SUBJOB III of the turn-over unit 6 is terminated.

Figure 6:
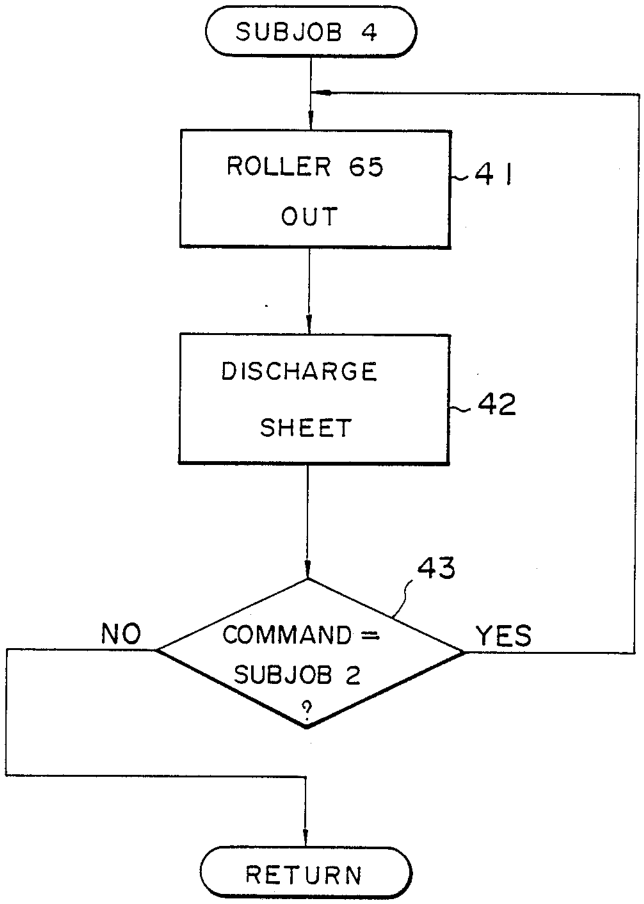
FIG. 6 is a flowchart showing the operation of the sheet turn-over unit in a second mode.

Further, FIG. 6 shows the operation of the sheet turn-over unit 6 in a mode SUBJOB IV. In this mode, the roller 65 is disengaged from the path 6A in a step 41 responsive to a command SUBJOB-4 and the sheet is discharged from the unit 6 along the path 6A in a step 42. Further, depending on the result of discrimination of whether the command SUBJOB-4 is continuing or not, the steps following the step 41 is repeated or the mode of operation is terminated as shown in FIG. 6.

Next, the control operation of the controller 9 for producing the command signals SUBJOB-1 through SUBJOB-4, which is the essential feature of the present invention, will be described with reference to the flowchart of FIGS. 7(A) and (B).

In a step 51, a command indicating the recording of images on both sides of a sheet is given to the controller 9 by the computer 8. Responsive thereto, the command SUBJOB-3 is given to the turn-over unit 6 in a step 52 via the line 96. The steps 51 and 52 are for initialization of the controller 9 for starting the recording.

Next, in a step 53, a count N in a counter which is provided in the controller 9 is set to one and the command SUBJOB-1 is supplied to the printer unit 1 in a step 54 via the line 91. Thereby, the printer unit is operated in the foregoing SUBJOB I mode and the sheets are consecutively supplied from the tray *2a* or *2b* one by one and are recorded with the images on their first side by the photosensitive drum 14. The sheets thus recorded are then supplied to the sheet turn-over unit 6 one after another. As the command SUBJOB-3 is previously given in the step 52, the turn-over unit 6 is operated in the SUBJOB III mode and the sheets supplied thereto are fed further to the refeed unit 7 after the switchback as already described. Note that the sheet turn-over unit 6 has the sensor S6 in the vicinity of the rollers 60 for detecting that a sheet is supplied to the unit 6. Thus, each time a sheet is supplied to the turn-over unit 6 passing by the sensor S6, the count N is increased by one in a step 55. The sheet supplied to the refeed unit 7 is fed further to the outlet OUT1 as already described.

In a step 56, this count N is compared with a predetermined number $N_Z$ which corresponds to the maximum number of sheets that can be held in the printer unit 1 and the sheet turn-over unit 6 at one time without overlapping as will be described later in more detail. When the count N has not exceeded the number $N_Z$, the operation of the printer unit 1 in the SUBJOB I mode and the operation of the sheet turn-over unit 6 in the SUBJOB III mode are repeated in the steps 54 and 55 while when the count N has exceeded $N_Z$, the command SUBJOB-3 is supplied to the turn-over unit 6 in a step 57. In this first operational cycle, the unit 6 is already given the command SUBJOB-3 in the previous initialization step 52 and no change occurs in the operation of the printer. Further, in a step 58, a discrimination is made if the count N is equal to or smaller than a maximum count $N_{MAX}$ which represents a maximum number of sheets that can be held in the printer at one time without overlapping. In the example described hereinafter, the maximum count $N_{MAX}$ is assumed to four (4). In other words, four sheets can exist in the path of the sheet of the printer simultaneously without overlapping. The maximum count $N_{MAX}$ is changed depending on the physical length of the path of the sheet in the printer including the printer unit 1, the sheet turn-over unit 6 and the refeed unit 7.

When the count N is smaller than $N_{NMAX}$, it means that there is still a room for new sheet to be accommodated in the printer and the step 54 for operating the printer unit 1 in the SUBJOB I mode including the step of feeding a new sheet from the tray, is performed.

When the count N has exceeded $N_{MAX}$, on the other hand, the count N is again set to one in a step 59 and the command SUBJOB-2 is supplied to the printer unit 1 via the line 91 in a step 60. Responsive thereto, the printer unit 1 starts to operate in the SUBJOB II mode while the sheet turn-over unit 6 still operating in the SUBJOB III mode. In this mode, the printer unit 1 is supplied with the sheet from the refeed unit 7 while the sheet turn-over unit 6 is still feeding the sheet to the refeed unit 7. Similarly to the step 53, the count N is increased each time a sheet passes by the sensor S6 in a step 61.

In a step 62, a discrimination is made if the count N has exceeded the number $N_Z$ or not. If the count N has not exceeded, the step 60 is continued and the printer unit 1 is operated in the SUBJOB II mode and the sheet turn-over unit 6 is operated in the SUBJOB III mode. When the count N has exceeded the number $N_Z$, the command SUBJOB-4 is supplied in the step 63 to the sheet turn-over unit 6 and the operational mode of the unit 6 is switched to the SUBJOB IV mode. Thereby, the printer unit 1 is operated in the SUBJOB II mode for feeding the sheet to the printer unit 1 from the refeed unit 7 and the sheet turn-over unit 6 is operated in the SUBJOB IV mode for discharging the sheet to the tray ST2.

In a step 64, it is discriminated whether the count N has exceeded the number $N_{MAX}$ or not. If the count N is equal to or smaller than $N_{MAX}$, the steps 60 through 63 are repeated while when the count N has exceeded, the operation returns to the step 53. Note that the operational mode of the sheet turn-over unit 6 is still in the mode SUBJOB IV in contrast to the previous case for initialization. After the step 53, the entire steps are repeated until a command is given in a step 65 to terminate the printing.

From the description heretofore, it will be understood that the operation of the printer unit 1 and the sheet turn-over unit 6 is made as a repetition of jobs. Thus, one unit job of the printer unit 1 comprises the SUBJOB I and the SUBJOB II while one unit job of the sheet turn-over unit 6 comprises the SUBJOB III and the SUBJOB IV. Further, it will be noted that there is a delay in the switching of the operation mode in the printer unit 1 and in the sheet turn-over unit 6. Such a delay is provided for continuous operation of the printer such that the printing of a new sheet supplied from the tray *2a*, *2b* is started before the last sheet in the previous job is discharged from the printer. In the following description, the actual feeding of the sheet in the printer according to the foregoing procedure will be described with reference to FIGS. 8(A)-(O).

In this example, the parameter $N_Z$ representing the maximum number of sheets that can be held in the printer unit 1 and sheet turn-over unit 6 at one time is set to two ($N_Z=2$) and the parameter $N_{MAX}$ representing the maximum number of sheets that can be held in the entire printer apparatus is set to four ($N_{MAX}=4$) as will be apparent from the drawings.

Figure 8A:
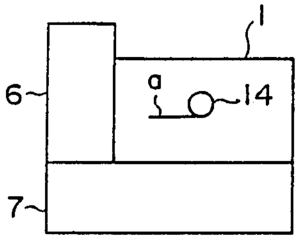
FIGS. 8(A)–(O) are schematical diagrams showing various state of sheet feeding which is controlled according to the flowchart of FIGS. 7(A) and (B)
Figure 8B:
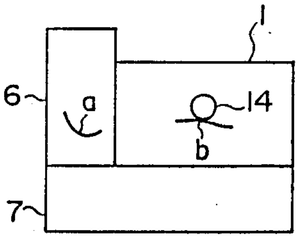

In a step of FIG. 8(A), a sheet a is supplied to the printer unit 1 operating in the SUBJOB I mode from the sheet feed part 2 and an image is recorded on its first side by the drum 14 in correspondence to the step 54. In this state, the count N is set to one (N=1). In a step of FIG. 8(B), the sheet a is fed to the sheet turn-over unit 6 and a new sheet b is supplied to the printer unit 1 from the sheet feed part 2. When the sheet a is fed to the unit 6, the count N is increased to two (N=2). The sheet b is recorded with an image on its first side similarly to the sheet a.

Figure 8C:
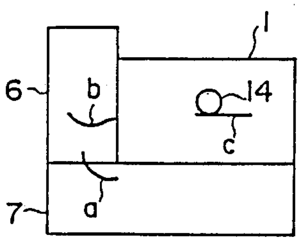

In a step of FIG. 8(C), the sheet a is supplied forward to the refeed unit 7 while the sheet b is supplied to the sheet turn-over unit 6. Note that the sheet turn-over unit 6 is operating in the mode SUBJOB III as a result of initialization in the step 52. The count N in this state is further increased to three (N=3). Responsive to the increase of the count N beyond the count $N_Z(=2)$, the mode of the unit 6 is set to SUBJOB III in the step 57. However, this mode change does not provide any effect as the unit 6 is already operating in the mode SUBJOB III as a result of the initialization. Further, a new sheet c is supplied to the printer unit 1 and is recorded with an image on its first side.

Figure 8D:
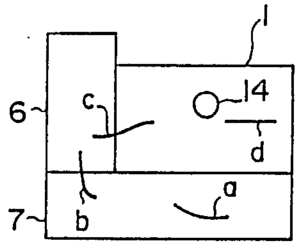

Further, in a step of FIG. 8(D), a new sheet d is supplied to the printer 1 from the sheet feed part 2 while the sheet a is transported to the outlet OUT2 in the refeed unit 7, the sheet b to the refeed unit 7, and the sheet c to the sheet turn-over unit 6. Further, the count N is increased to 4 responsive to the feeding of the sheet c to the unit 6.

Figure 8E:
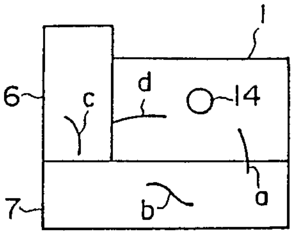

In a step of FIG. 8(E), the sheet d is fed from the printer unit 1 to the sheet turn-over unit 6 and the count N is increased to five (N=5). Responsive thereto, the mode of the printer unit 1 is switched to the SUBJOB II mode and the printer unit 1 receives the sheet a from the refeed unit 7. Further, the count N is reset to one (N=1) in correspondence to the step 59. On the other hand, the sheet turn-over unit 6 is still operating in the mode SUBJOB III and the sheet c is fed to the sheet turn-over unit 6. Further, the sheet b previously fed to the refeed unit 7 is transported to the outlet OUT2.

Figure 8F:
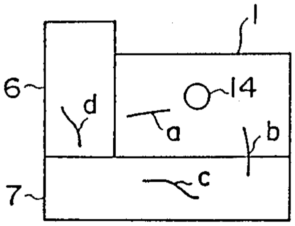

In a step of FIG. 8(F), the sheet a is printed with an image on the other side in the printer unit 1 and is fed further to the sheet turn-over unit 6. Thereby, the count N is changed to two (N=2). Further, the sheet d is fed to the refeed unit 7 from the sheet turn-over unit 6 still operating in the mode SUBJOB III and the sheet c is transported to the outlet OUT2 in the refeed unit 7.

Figure 8G:
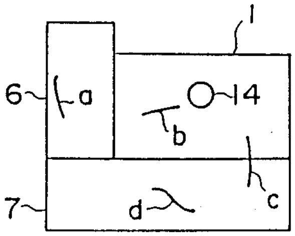

In a step of FIG. 8(G), the sheet b is printed with an image on the other side and the sheet a recorded with the images on its both sides is supplied to the sheet turn-over unit 6. Thereby, the count N is increased to three (N=3) and the count $N_Z$ is exceeded. Responsive thereto, the mode of the sheet turn-over unit 6 is switched to the mode SUBJOB IV. Further, the sheet c is supplied to the printer unit 1 again from the refeed unit 7 and the sheet d is transported to the outlet OUT2 in the refeed unit 7.

Figure 8H:
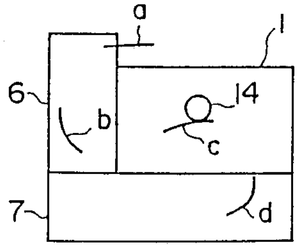

In a step of FIG. 8(H), the sheet a in the sheet turn-over unit 6 is discharged and the sheet b recorded with the images on its both sides is fed to the sheet turn-over unit 6. Further, the sheet c previously fed to the printer unit 1 from the refeed unit 17 is recorded with an image on the other side and the sheet d is fed to the printer unit 1 from the the refeed unit 7 through its outlet OUT2. Responsive to the feeding of the sheet b to the unit 6, the count N is set to four (N=4).

Figure 8I:
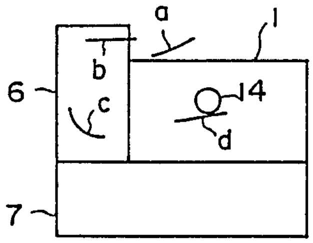

In a step of FIG. 8(I), the sheet d is recorded with an image on the other side in the printer unit 6 and the sheet c recorded with the images on its both sides is fed from the printer unit 1 to the sheet turn-over unit 6. Thereby the count N is set to five (N=5). Responsive thereto, the mode of the printer unit 1 is switched to SUBJOB I in the step 54. Further, the count N is reset to one (N=1) in the step 53. Further, the sheet b is discharged by the sheet turn-over unit 6.

Figure 8J:
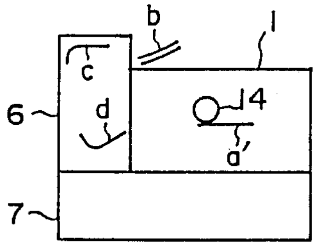

In a step of FIG. 8(J), a new sheet a', is fed to the printer unit 1 responsive to the SUBJOB I mode and and the sheet d recorded with the images on its both sides is fed from the printer unit 1 to the sheet turn-over unit 6. Thereby, the count N is increased to two (N=2). Further, the sheet c is discharged from the sheet turn-over unit 6.

Figure 8K:
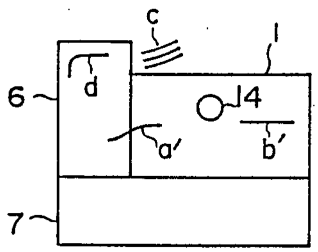

In a step of FIG. 8(K), the sheet a', is recorded with an image on its first side and is fed to the sheet turn-over unit 6 and at the same time the sheet d is discharged from the unit 6. Thereby, the count N is increased to three (N=3) and a new sheet b', is fed to the printer unit 1 from the sheet feeding part 2.

Figure 8L:
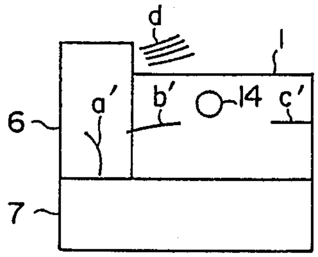

In a step of FIG. 8(L), the mode of the sheet turn-over unit 6 is switched to the mode SUBJOB III corresponding to the step 57 and the sheet a', is fed to the refeed unit 7. Further, the sheet b', is recorded with an image on its first side and a new sheet c', is fed to the printer unit 1 from the sheet feed part 2.

Figure 8M:
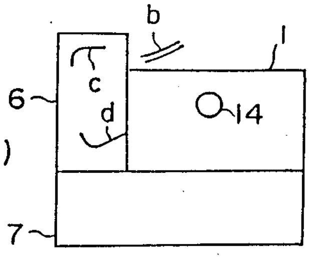
Figure 8N:
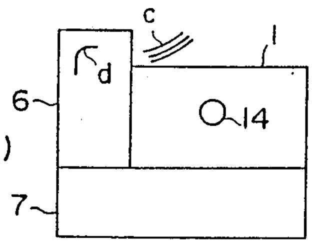
Figure 8O:
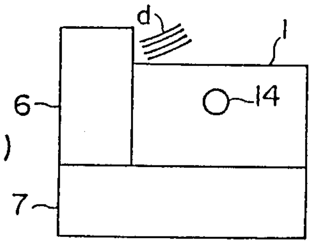

By repeating the steps of FIGS. 8(A)–(L), one can perform the recording of images on both sides of sheets consecutively. When a command is given for terminating the print in the step 65, the feeding of new sheets after the step of FIG. 8(I) is prohibited. Thus, as shown in FIGS. 8(M) and (N), the sheets c and d remaining in the printer unit 1 and the sheet turn-over unit 6 are consecutively discharged and the printer terminates its operation in a state shown in FIG. 8(O).

In the foregoing steps, note that the printer unit 1 assumes the mode SUBJOB I in the steps of FIG. 8(A-)–(D) and the mode SUBJOB II in the succeeding steps of FIGS. 8(E)–(I). The mode of the printer unit 1 is further changed of the mode SUBJOB I again in the steps of FIGS. 8(J)–(L). Thus, the steps of FIGS. 8(A-)–(J) forms one unit job of the printer unit 1.

On the other hand, the operational mode of the sheet turn-over unit 6 is switched between the SUBJOB III mode and the SUBJOB IV mode such that the unit 6 operates in the SUBJOB III mode in the initialization steps of FIGS. 8(A) and (B), in the SUBJOB III mode in the steps of FIGS. 8(C)–(F), in the SUBJOB IV mode in the steps of FIGS. 8(G)–(K), and again in the SUBJOB III mode in the step of FIG. 8(L). Thus, the steps of FIGS. 8(C)–(K) forms a unit job of the sheet turn-over unit 6. In this way, the printer unit 1 and the sheet turn-over unit 6 perform the respective jobs repeatedly with a delay in the start and stop of the jobs.

In the description heretofore, it was assumed that the parameter $N_{MAX}$ is the maximum number of sheets that can be held in the printer at one time for the sake of simplicity of the explanation. However, $N_{MAX}$ is not limited as such but may be any integer that is equal to or smaller than the maximum number of sheets that can be held in the printer. For example, $N_{MAX}$ includes one $N_{MAX}=1$) even when the printer can hold four or more sheets therein at one time. Similarly, $N_Z$ is not limited to the maximum number of sheets which can be held in the printer unit 1 and in the sheet turn-over unit 6.

In the present invention, the sheets are passed one by one through the printer without stacking in the refeed unit 7 or in other location and the problem such as overlapped feeding of sheet does not occur. Thus, the problem of unreliable sheet transport which is critical to the image formation on both sides of a sheet is successfully solved by the present invention. Further, as will be obvious from the flowchart of FIG. 3, sheets having different sizes may be used or mixed in the printer without problem. Further, even when a jam occurs, the jam damages only the job in which the jam has occured and the printing can be restarted from that job without difficulty. Thus, the load of the controller is significantly reduced.

Figure 9:
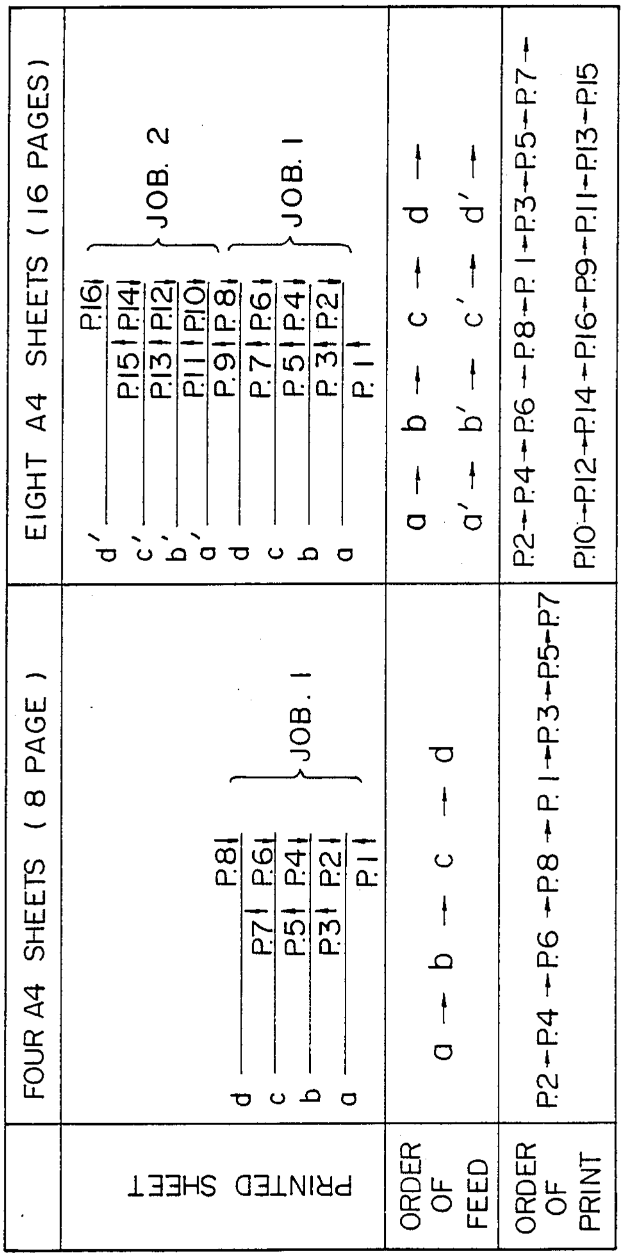
FIG. 9 is a diagram showing the order of sheet feeding and printing as well as the sheets obtained by the printing procedure.

FIG. 9 shows the state of the printed sheet according to the foregoing procedure. In the case of printing an eight page document on both sides of four A4 size sheets, four sheets a, b, c and d are supplied consecutively and the print is made according to an order in one job or JOB 1 such that the page 2 of the document is printed on a first side of the sheet a, the page 4 on the first side of the sheet b, the page 6 on the first side of the sheet c, and the page 8 on the first side of the sheet d. Further, the page 1 of the document is printed on a second side of the sheet a, the page 3 on the second side of the sheet b, the page 5 on the second side of the sheet c, and the page 7 on the second side of the sheet d. As a result, the sheets are printed with the informations as shown in the column "PRINTED SHEET". In this column, the arrow indicates the side of the sheet on which the informations of the pages are printed.

FIG. 9 also shows a case in which a sixteen page document is printed on both sides of eight A4 sheets in a two consecutive jobs, JOB1 and JOB2. In this case, the sheets a, b, c, d, a', b', c' and d' are consecutively supplied and the informations of the pages 2, 4, 6 and 8 are printed on the first side of the sheets a, b, c and d respectively. Further, the sheets a, b, c and d are printed with the images of the pages 1, 3, 5 and 7 respectively and the JOB1 is completed. Next, in the JOB2, the informations of the pages 10, 12, 14 and 16 are printed on the first side of the sheets a', b', c' and d' and further the informations of the pages 9, 11, 13 and 15 are printed on the second side of the sheets a', b', c' and d'. Thus, the sheets recorded with informations as shown in the column "PRINTED SHEET" of this drawing is obtained.

Next, a second embodiment of the present invention for terminating the operation of the printer responsive to a stop command requiring termination of the operation of the printer though without urgency. Such a not-urgent stop command may occur for example when the toner or fixing oil is nearly run out or when the tray for holding the supply of sheet is nearly empty. In such a case, it is desired that the printer is stopped after the printing on the sheets already in the printer for the previous job is completed.

Figure 10:
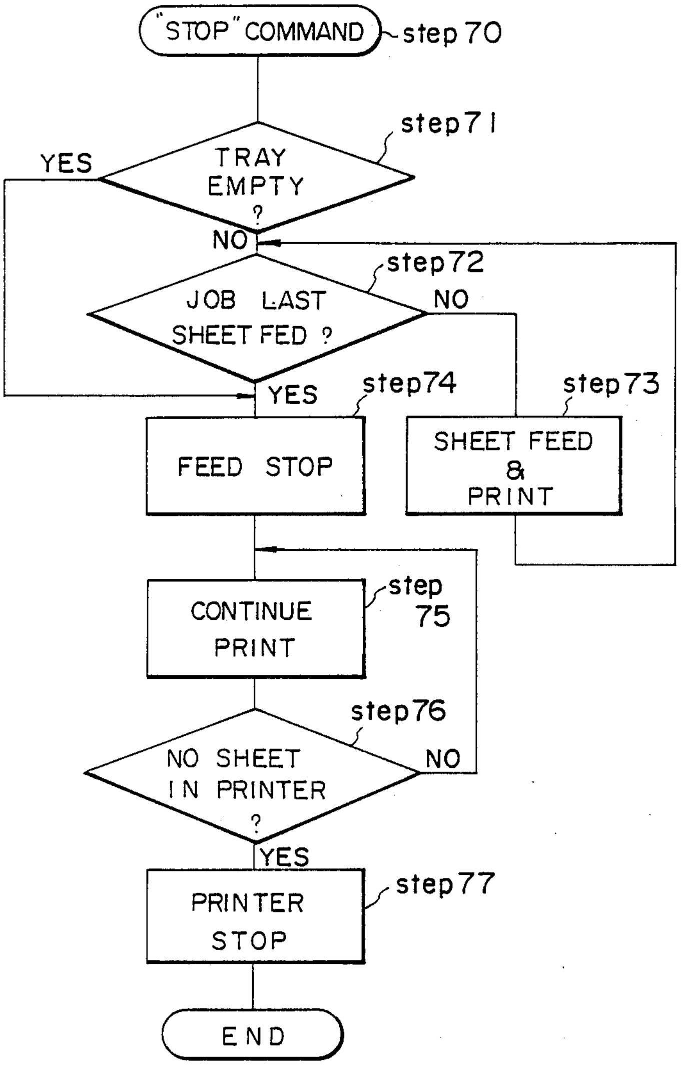
FIG. 10 is a flowchart showing an embodiment of the present invention to stop the printer responsive to a not-urgent stop command.

FIG. 10 shows a flowchart for performing such a procedure. In this example, the stop command is given responsive to the detection that the toner is nearly run out. Referring to the drawing, a stop command is given in a step 70 and a discrimination is made in a step 71 if the tray *2a* or *2b* for supplying the sheet is empty or not. If the result is NO, it is further discriminated in a step 72 whether the last sheet in the currently performed job is fed to the printer unit 1 or not in a step 72 and if the result is NO, the feeding and printing corresponding to the foregoing procedures in FIG. 5 is continued. When it is detected that the last sheet of the job has been supplied to the printer in the step 72, the feed of new sheet is prohibited in a step 74 by providing an appropriate command signal to the printer unit 1 while the printing on the sheets already existing in the printer is continued in a step 75. Further, it is discriminated in a step 76 if all the sheets in the printer have completed the printing on their both sides, the printer is stopped in a step 77. According to the foregoing procedure, the printer stops in a state that a previous job has just completed. Therefore, the restarting of the printer can be made easily.

When the tray becomes empty in the step 71, the feeding of the sheet is immediately stopped in the step 74 as there is no sheet in the tray to be fed to the printer and the steps after the step 74 are performed. After the printer is stopped, the toner is refilled. A similar procedure is also applicable to the case where the fixing oil becomes near empty. Of course, the feeding of the new sheet may be immediately stopped as in the steps 71 and 74 for the case of running out of the new sheets, responsive to the detection of the nearly run-out state of the toner or fixing oil.

Figure 7A:
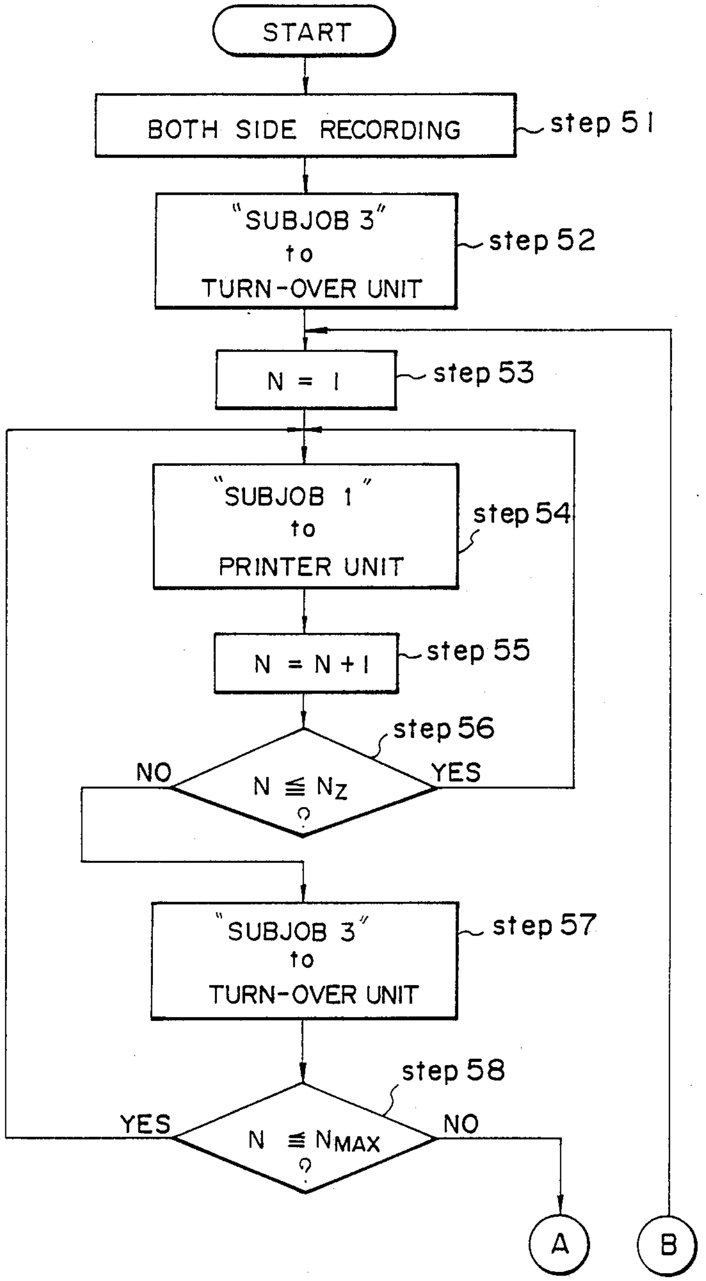
FIGS. 7(A) and (B) are flowcharts showing a control operation of a controller of the printer of FIG. 1.
Figure 7B:
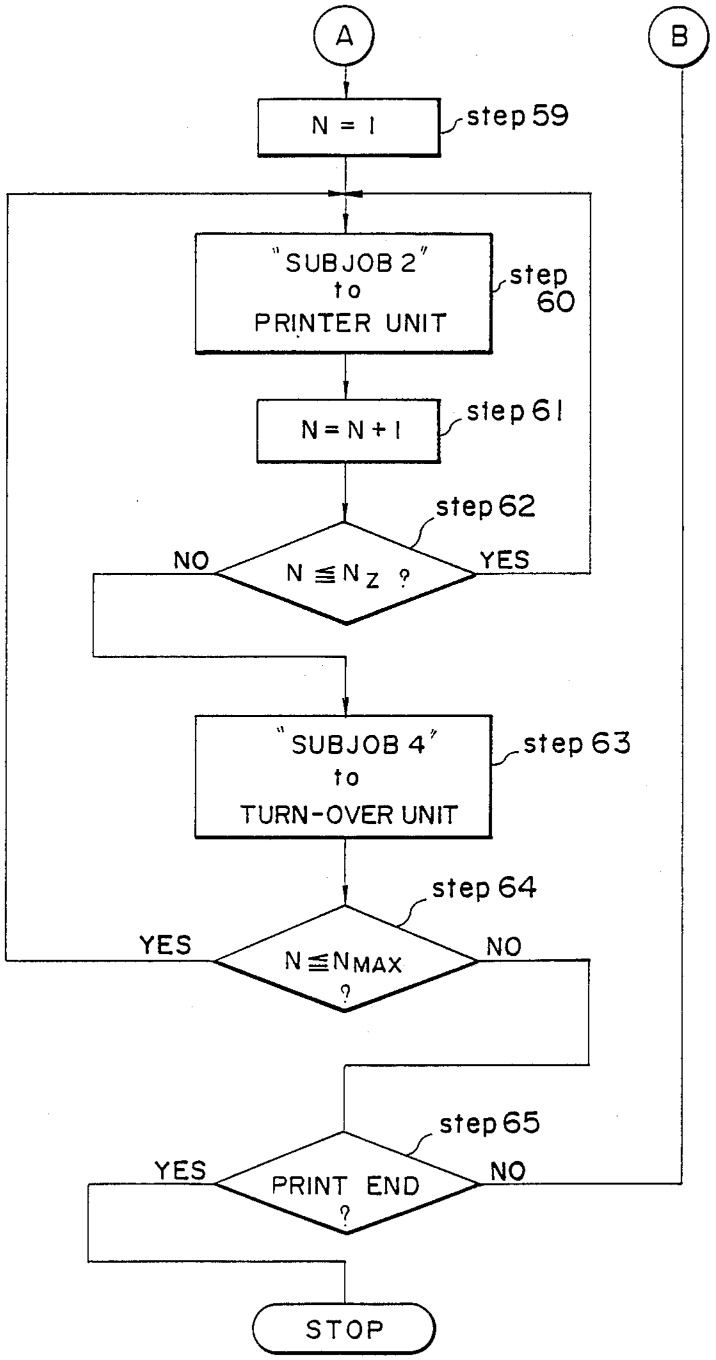

Further, the stop of the printer may be performed by providing the command "PRINT END" in the control procedure of FIGS. 7(A) and (B). When this command is given, the printer is stopped responsive to the step 65 in the state that the foregoing job has just completed.

Next, a third embodiment of the present invention for controlling the printer such that the feeding of the sheet is adjusted responsive to the delay in supplying the image information to the printer unit 1 from the computer 8 or the like, will be described. Such a delay may occur when the load of the microprocessor in the computer is excessive or when the transmission line is congested in the case when the printer is used for facsimile transmission.

It is rather common that there is a variable delay in the image data supplied to the printer and the interval between one image data and a next image data is not constant when it is received by the printer unit. Usually, such a delay is minute and can be easily adjusted by controlling the timing that the sheet is fed forward to the photosensitive drum 14. Thus, in the prior as shown in FIG. 1 for forming images on both sides of a sheet, the timing roller 13 is stopped for an appropriate time interval while continuously feeding the sheet through the refeed unit 7. As this time interval is minute, such a continuous feeding of the sheet through the refeed unit 7 while stopping the timing roller 13 does not cause problems such as the sheet in the refeed unit 7 catching up with and overlapping the sheet held by the timing roller 13. When the delay becomes large and reaches a magnitude comparable to one page of the sheet, however, this problem becomes a matter of reality.

Figure 11:
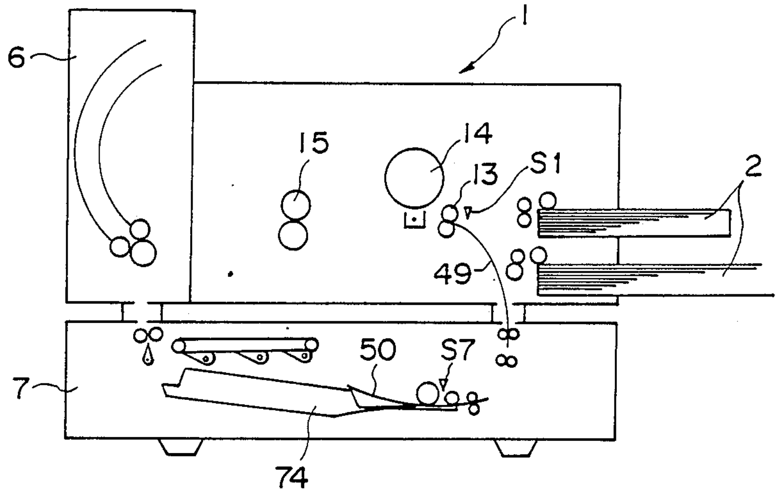
FIGS. 11 and 12 are diagrams showing the feeding of the sheet in the printer of FIG. 1.

In order to avoid this problem, the present invention controls the feeding of the sheet such that a sheet 50 (FIG. 11) which are already recorded with the images on their first side and is on the way to the printer unit 1 through the refeed unit 7 is held at the location of the tray 74. Note that FIG. 11 shows the printer essentially the same as that of FIG. 1 and the description thereof will be omitted. This holding of the sheet 50 at the tray 74 is removed when the delay in the image formation of the photosensitive drum 14 is eliminated.

In this embodiment, the timing roller 13 is controlled, but not directly, responsive to the timing the image data is supplied to the printer unit 1 from the computer 8. More specifically, there is provided a sensor S1 in a vicinity of the timing roller 13 for detecting a sheet 49 held by the timing roller 13 for recording, and the timing roller 13 feeds the sheet 49 forward responsive to the rotation of the photosensitive drum 14 when the image formation on the drum 14 is completed. Thus, the timing roller 1 is controlled by the rotation of the photosensitive drum 14 which in turn is controlled responsive to the rotation of the photosensitive drum 14. In order to avoid that the sheet 50 overtakes the sheet 49 waiting for the feeding to the drum 14, the present embodiment controls the sheet 50 to wait at the location of the intermediate tray 74 until the sheet 49 is fed to the photosensitive drum 14. For this purpose, there is provided a sensor S7 in a vicinity of the pivotted roller 46 and the stopper 47.

According to this embodiment, the feeding of the sheet 50 forward from the tray 74 is prohibited: (a) when the existence of the preceding sheet 49 is detected by the sensor S1: (b) when the timing roller 13 is held stationary; and (c) when the leading edge of the next sheet 50 is detected by the sensor S7. As the feeding of the sheet 50 is prohibited when the sheet 49 is waiting, problems such as the collision of the sheets or the sheet 50 overtaking the sheet 49 do not occur.

Figure 12:
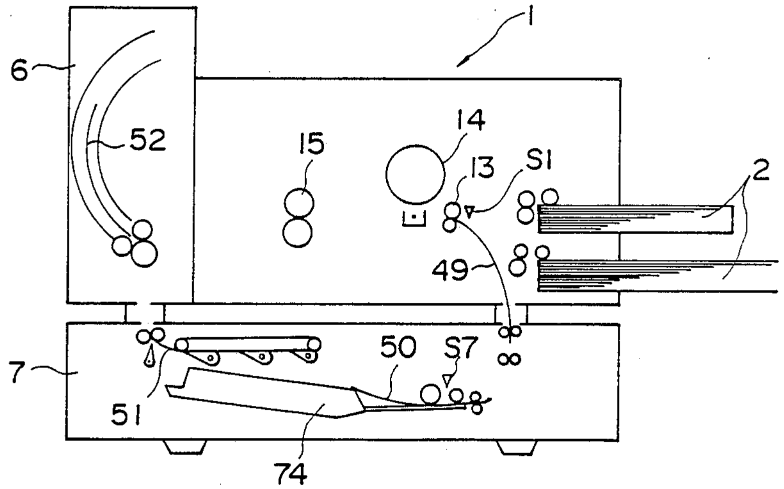

When there are another sheet 52 in the sheet turn-over unit 6 and a sheet 51 in the refeed unit 7 as shown in FIG. 12 for recording of the image on the other side, the feeding in the unit 6 as well as the feeding of the gate part 73 in the refeed unit 7 are stopped until the sheet 49 is fed forward.

When the sheet 52 in the sheet turn-over unit 6 is the one already recorded with the images on the both sides, on the other hand, it is desired that the operation of the unit 6 is not stopped but the sheet 52 is discharged from the sheet turn-over unit 6 irrespective to the state of the sheet 49.

Figure 13:
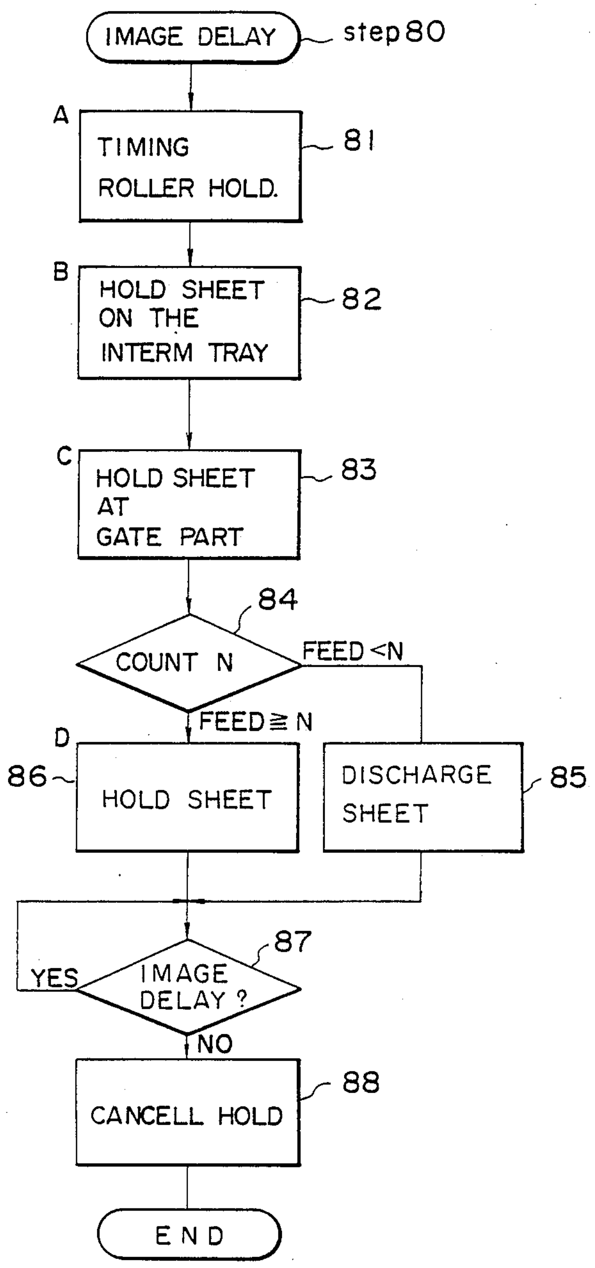
FIG. 13 is a flowchart showing another embodiment of the present invention to hold the feeding of sheets in the printer responsive to delay in formation of images ready to be transferred to a sheet.

FIG. 13 shows the control process for obtaining the foregoing result in a form of flowchart.

Referring to FIG. 13, when there is a delay in the image formation on the photosensitive drum 14 as in a step 80, the timing roller 13 is stopped in a step 81. Further, in a step 82, a sheet in the refeed unit 7 is held at the position of the tray 74 as in the case of the sheet 50 of FIG. 12. Further, in a step 83, a sheet is held at the position of the gate part 73 when there is another sheet in the refeed unit 7 at the upstream side of the sheet 50 as in the case of sheet 51. In a step 84, the count N obtained by the detector S6 is referenced. If the count N has exceeded the the maximum number of sheet that can be accommodated in the printer or $N_{MAX}$, this means that there is or are sheet(s) in the sheet turn-over unit 6 which is recorded with the images on its both sides and the turn-over unit 6 is operated in the foregoing mode SUBJOB IV. As a result, the sheet in the unit 6 is discharged in a step 85 while other sheets in the printer are held stationary. When the count N is equal to or smaller than $N_{MAX}$, on the other hand, this means that there is no sheet which are ready for discharge and any sheet in the sheet turn-over unit 6 is to be fed to the refeed unit 7. Thus, the unit 6 is stopped in a step 86. Further, it is discriminated if there still exists the delay of the image formation in a step 87 and when the delay is removed, the holding procedures in the foregoing steps 81, 82, 83 and 86 are cancelled.

Further, the present invention is not limited to these embodiments but various variations and modifications may be made without departing from the scope of the invention.

What is claimed is:

1. A method of forming images on both sides of a plurality of sheets by an image forming apparatus comprising an image forming unit supplied with the sheets for recording the images on one side thereof and a sheet path selection unit supplied with the sheets from the image forming unit for performing either one of a refeeding of the sheets to the image forming unit together with a turning-over of the side of the sheets and a discharging of the sheets from the image forming apparatus, comprising a step of:

performing a group of substeps for a plurality of times as a job unit, each of the job units comprising substeps of:

feeding a predetermined number of new sheets to the image forming unit one sheet by one sheet consecutively responsive to the feeding of the new sheets, forming the images on a first side of the sheets one sheet by one sheet, turning over the side of the sheets by the sheet path selection unit one sheet by one sheet each time the sheet is formed with the image on the first side thereof, refeeding said predetermined number of sheets turned over by the sheet path selection unit to the image forming unit one sheet by one sheet responsive to the turning-over of each sheet, forming the images on a second side of the sheets by the image forming unit one sheet by one sheet responsive to the refeeding of said predetermined number of sheets, and discharging said predetermined number of sheets by the sheet path selection unit one sheet by one sheet each time the sheet is formed with the image on the second side thereof, wherein said substep of feeding the predetermined new sheets is commenced for a new job unit when a last sheet of the currently performed job unit is fed to the sheet path selection unit after the substep of forming the images on the second side of the sheets but before said last sheet is discharged in the substep of discharging.

2. A method as claimed in claim 1 in which said predetermined number is set equal to or smaller than a maximum number of the sheets that can exist in a path of the sheet in the image forming apparatus without overlapping each other.

3. A method as claimed in claim 1 in which, when there is a delay in formation of the image in the image forming unit, said substeps of feeding the predetermined number of new sheets, forming the images on the first side of the sheets, turning over the side of the sheets, refeeding said predetermined number of sheets, and forming the images on the second side of the sheets are prohibited until the delay of the image formation is resolved while continuing the substep of discharging the sheet when there is a sheet already formed with the images on the both sides.

4. A method of forming images on both sides of a plurality of sheets by an image forming apparatus comprising an image forming unit supplied with the sheets for recording the images on one side thereof and a sheet path selection unit supplied with the sheets from the image forming unit for performing either one of a refeeding of the sheets to the image forming unit together with a turning-over of the side of the sheets and a discharging of the sheets from the image forming apparatus, said method comprising steps of:

performing a group of substeps repeatedly for one or a plurality of times as a job unit, each of the job units comprising substeps of:

feeding a predetermined number of new sheets to the image forming unit one sheet by one sheet consecutively responsive to the feeding of the new sheets, forming the images on a first side of the sheets one sheet by one sheet, turning over the side of the sheets by the sheet path selection unit one sheet by one sheet each time the sheet is formed with the image on the first side thereof, refeeding said predetermined number of sheets turned over by the sheet path selection unit to the image forming unit one sheet by one sheet responsive to the turning-over of each sheet, forming the images on a second side of the sheets by the image forming unit one sheet by one sheet responsive to the refeeding of said predetermined number of sheets, and discharging said predetermined number of sheets by the sheet path selection unit one sheet by one sheet each time the sheet is formed with the image on the second side thereof; and terminating the image formation responsive to a command signal such that the operation of the image forming apparatus is terminated responsive to an end of a currently performed job unit.

5. A method as claimed in claim 4 in which said step of terminating comprises substeps of prohibiting commencement of a new job unit and performing the currently performed job unit until the job unit is completed.

6. A method of controlling an image forming apparatus comprising an image forming unit and a sheet path selection unit, said image forming unit operating selectively either in a first mode in which new sheets are supplied thereto one by one and images are formed on one side of the sheets and a second mode in which the sheets are re-supplied from the sheet path selection unit one by one and images are formed on the other side thereof, said sheet path selection unit operating selectively either in a first mode for refeeding the sheets from the image forming unit again to the image forming unit and a second mode for discharging the sheets from the image forming apparatus, said method comprising steps of:

repeating a group of substeps, each group comprising the substeps of:

switching the mode of the image forming unit to the first mode when a first predetermined number of the sheets are formed with the images by the image forming unit since a previous switching of the mode of the image forming unit to the second mode, switching the mode of the image forming unit to the second mode when said first predetermined number of the sheets are formed with the images by the image forming unit since the previous switching of the mode of the image forming unit to the first mode, switching the mode of the sheet path selection unit to the first mode when said first predetermined number of the sheets are supplied to the sheet path selection unit since a previous switching of the mode of the sheet path selection unit to the second mode, and switching the mode of the sheet path selection unit to the second mode when said first predetermined number of the sheets are supplied to the sheet path selection unit since the previous switching of the mode of the sheet path selection unit to the first mode, each of said switching of the mode of the sheet path selection unit being made when a second predetermined number of sheets are supplied to the sheet path selection unit since the last switching of the mode of the image forming unit; and terminating the repetition of said group of substeps responsive to a command signal, said step of terminating comprising substeps of:

operating the image forming unit until the mode of the image forming unit is switched to the first mode, stopping the image forming unit responsive to the switching of the mode of the image forming unit to the first mode, operating the sheet path selection means until the mode of the sheet path selection means is switched to the first mode, and stopping the sheet path selection means responsive to the switching of the mode of the sheet path selection unit to the first mode.

7. A method as claimed in claim 6 in which said first predetermined number is set equal to or smaller than a maximum number of sheets that can exist in a path of the sheet in the image forming unit and in the sheet path selection unit at one time without overlapping each other, and said second predetermined number is set smaller than said first predetermined number.

8. A method as claimed in claim 6 further comprising steps of operating said image forming unit in the first mode and operating said sheet path selection unit in the first mode, when the image forming apparatus is started with a state in which there is no sheet in the apparatus.

* * * * *

UNITED STATES PATENT AND TRADEMARK OFFICE

CERTIFICATE OF CORRECTION

PATENT NO. : 4,975,738

DATED : December 4, 1990

INVENTOR(S) : Toshitaka Senma et al.

It is certified that error appears in the above-identified patent and that said Letters Patent is hereby corrected as shown below:

Title Page, left-hand column, after "[22] Filed: Jan. 18, 1990", insert a new section as follows:

--[30] Foreign Application Priority Data

Jan. 25, 1989 [JP] Japan............1-15845--.

Signed and Sealed this

Sixth Day of October, 1992

*Attest:*

DOUGLAS B. COMER

*Attesting Officer*

*Acting Commissioner of Patents and Trademarks*